United States Patent
Curtin et al.

(10) Patent No.: US 12,034,883 B2
(45) Date of Patent: Jul. 9, 2024

(54) SYSTEMS AND METHODS FOR AN INTELLIGENT SCRIPTING ENGINE

(71) Applicant: American TEL-A-Systems, Inc., McFarland, WI (US)

(72) Inventors: Thomas V. Curtin, Madison, WI (US); Kevin Mark Beale, Stoughton, WI (US); Paul L. Hansen, McFarland, WI (US); Wayne Paul Waldner, Richland Center, WI (US); Daniel R. Cropp, McFarland, WI (US)

(73) Assignee: AMERICAN TEL-A-SYSTEMS, INC., McFarland, WI (US)

( * ) Notice: Subject to any disclaimer, the term of this patent is extended or adjusted under 35 U.S.C. 154(b) by 310 days.

(21) Appl. No.: 17/495,393

(22) Filed: Oct. 6, 2021

(65) Prior Publication Data
US 2023/0109021 A1    Apr. 6, 2023

(51) Int. Cl.
*H04M 3/51*     (2006.01)
*G06F 16/332*   (2019.01)
*H04M 3/493*    (2006.01)

(52) U.S. Cl.
CPC ...... *H04M 3/5175* (2013.01); *G06F 16/3329* (2019.01); *H04M 3/493* (2013.01);
(Continued)

(58) Field of Classification Search
CPC .. H04M 3/5175; H04M 3/493; H04M 3/5166; H04M 3/5183; H04M 2203/558;
(Continued)

(56) References Cited

U.S. PATENT DOCUMENTS 6,826,745 B2    11/2004   Coker et al.
7,213,209 B2    5/2007    Lueckhoff et al.
(Continued)

FOREIGN PATENT DOCUMENTS

CN    103795877 A       5/2014
IN    202041027322 A    10/2020
(Continued)

OTHER PUBLICATIONS

Patents Act 1977: Search Report under Section 17 corresponding to GB2213513.1 dated Feb. 27, 2023, 1 page.
(Continued)

*Primary Examiner* — Lisa Hashem
(74) *Attorney, Agent, or Firm* — Baker Botts L.L.P.

(57) ABSTRACT

A system comprises a database configured to store a plurality of baseline scripts, an applications server communicatively coupled to the database, and an analytics engine. Each of the plurality of baseline scripts is associated with a client of a call center and comprises a plurality of questions for guiding a communication session between an agent and a party. The applications server is configured to monitor a plurality of communication sessions. Each of the plurality of communication sessions is guided by a respective one of the plurality of baseline scripts. The applications server is further configured to obtain information about an actual call flow of each of the communication sessions and send the obtained information about the actual call flow of each of the communication sessions to the analytics engine. The analytics engine is configured to determine one or more proposed changes to a baseline script.

22 Claims, 4 Drawing Sheets

(52) U.S. Cl.
CPC ....... *H04M 3/5166* (2013.01); *H04M 3/5183* (2013.01); *H04M 2203/558* (2013.01)

(58) Field of Classification Search
CPC .............. H04M 2203/357; H04M 3/51; G06F 16/3329; G06Q 30/02
See application file for complete search history.

(56) References Cited

U.S. PATENT DOCUMENTS

| | | | |
|---|---|---|---|
| 7,593,522 | B2 | 9/2009 | Parker-Stephen |
| 8,126,832 | B2 | 2/2012 | Spring |
| 8,706,498 | B2 * | 4/2014 | George ............... H04M 3/5166 379/265.09 |
| 8,755,510 | B2 | 6/2014 | Erbey et al. |
| 9,082,125 | B2 | 7/2015 | Lawrence et al. |
| 10,742,813 | B2 | 8/2020 | Copeland |
| 11,356,558 | B2 * | 6/2022 | Brown ................ H04M 3/5175 |
| 11,720,835 | B2 * | 8/2023 | Matula ................ H04M 3/5175 705/7.14 |
| 11,741,484 | B2 * | 8/2023 | McCord ............ G06Q 30/0201 707/738 |
| 11,743,378 | B1 * | 8/2023 | Johnston ............. H04M 3/4938 704/270.1 |
| 2002/0059283 | A1 | 5/2002 | Shapiro et al. |
| 2003/0041314 | A1 | 2/2003 | Heeren et al. |
| 2006/0095273 | A1 | 5/2006 | Montvay et al. |
| 2012/0317038 | A1 * | 12/2012 | Erbey ................. H04M 3/5183 705/304 |
| 2014/0314225 | A1 * | 10/2014 | Riahi ...................... H04L 51/02 379/265.09 |
| 2015/0256677 | A1 * | 9/2015 | Konig ................. H04M 3/5191 379/265.09 |
| 2018/0005158 | A1 | 1/2018 | Campbell |
| 2018/0165691 | A1 | 6/2018 | Heater et al. |
| 2021/0065692 | A1 * | 3/2021 | Barker .................... G10L 25/63 |
| 2023/0164100 | A1 * | 5/2023 | Fejes ................. H04M 3/5191 604/20 |
| 2023/0362301 | A1 * | 11/2023 | Curtin ................... H04M 3/541 |

FOREIGN PATENT DOCUMENTS

| | | |
|---|---|---|
| WO | 9605685 A1 | 2/1996 |
| WO | 20033226 A1 | 6/2000 |
| WO | 2004082252 A1 | 9/2004 |

OTHER PUBLICATIONS

Patents Act 1977: Letter corresponding to Search Report under Section 17(5) GB2213513.1, dated Feb. 28, 2023, 2 pages.

\* cited by examiner

SYSTEMS AND METHODS FOR AN INTELLIGENT SCRIPTING ENGINE

TECHNICAL FIELD

The present disclosure relates, in general, to communication systems and, more particularly, to systems and methods for an intelligent scripting engine.

BACKGROUND

Call-centers are designed to connect callers to agents or other company representatives for a variety of purposes. Business owners may require call-center services to manage incoming calls, including calls from prospective and existing customers. Customer experiences with call-centers are important to the success of the business. For example, if a prospective customer encounters difficulty being connected to the business' sales team, the business owner may lose a sale. For at least this reason, the use of scripts for guiding communication sessions (e.g., calls or webchats) between an agent and a caller are important to the success of the call-center, as it allows clients of the call-center to ensure the quality and consistency of the customer experience. One exemplary use of call scripts for information collection is healthcare code calls. Call scripts guide agents through the specific requirements for code calls, eliminating errors, ensuring the codes are completed quickly, and self-documenting all steps taken to complete each code call.

Systems have been developed to facilitate the development of call scripts. However, existing systems for the creation and maintenance of call scripts suffer from significant deficiencies. For example, existing approaches for the creation of scripts involve drafting scripts for each application. Different clients of a call-center, such as Doctors, Veterinarians, Funeral Homes, Real Estate Brokers, and Hospitals may have specific needs requiring the creation of custom scripts. As a consequence, script creation and maintenance (e.g., updating and modifying scripts) is a labor-intensive administrative task that requires significant call-center resources. It is often difficult to anticipate or predict the proper collection of prompts to guide the flow of a call as desired. Furthermore, when a call flow deviates from that desired by the client of a call center, it is challenging to determine what changes should be made to a script in order to properly control the flow of the call. Thus, there is a need for systems and methods for more efficient script creation and modification.

Another problem with existing approaches is that existing approaches are slow to update and optimize scripts to improve call flow. In existing approaches, call flow information is rarely analyzed unless clients complain. As a consequence, in existing systems, most scripts are left unoptimized, which results in scripts of diminished quality and can lead to unnecessary costs for the client. Thus, there is a need for systems and methods that optimize call flow in real-time.

SUMMARY

To address the foregoing problems with existing approaches, disclosed is a system. The system comprises a database, the database configured to store a plurality of baseline scripts, each of the plurality of baseline scripts associated with a client of a call center and comprising a plurality of questions for guiding a communication session between an agent and a party. The system further comprises an applications server communicatively coupled to the database and an analytics engine. The applications server may be configured to monitor a plurality of communication sessions, each of the plurality of communication sessions guided by a respective one of the plurality of baseline scripts. The applications server may be further configured to obtain information about an actual call flow of each of the communication sessions and send the obtained information about the actual call flow of each of the communication sessions to the analytics engine. The analytics engine may be configured to determine, based on an analysis of the obtained information about the actual call flow of each of the communication sessions in relation to each respective associated baseline script, one or more proposed changes to a first baseline script.

In certain embodiments, the analytics engine may be configured to send the one or more proposed changes to the first baseline script to the applications server.

In certain embodiments, the applications server may be configured to modify the first baseline script based on the one or more proposed changes to the first baseline script.

In certain embodiments, the applications server may be configured to notify a client (e.g., an administrator or manager) associated with the first baseline script that the one or more proposed changes to the first baseline script are available for review.

In certain embodiments, the applications server may be configured to receive, from the client associated with the first baseline script, an instruction to modify the first baseline script based on the one or more proposed changes to the first baseline script and modify the first baseline script based on the one or more proposed changes to the first baseline script in response to the received instruction.

In certain embodiments, the one or more proposed changes to the first baseline script may comprise one or more of a question to add to the first baseline script, a question to remove from the first baseline script, a change to one of the plurality of questions in the first baseline script, and a change to an order of presentation of the plurality of questions in the first baseline script.

In certain embodiments, the first baseline script may further comprise one or more possible responses to one or more of the plurality of questions. The one or more proposed changes to the first baseline script may comprise one or more of a possible response to add to the first baseline script, a possible response to remove from the first baseline script, and a change to the one or more possible responses.

In certain embodiments, the analysis of the obtained information about the actual call flow of each of the communication sessions in relation to each respective associated baseline script may comprise an identification of one or more deviations from an associated baseline script during each respective communication session.

In certain embodiments, the analytics engine may be configured to generate a new baseline script based on the obtained information about the actual call flow of each of the communication sessions to the analytics engine.

In certain embodiments, the agent may comprise a speech-enabled intelligent script and the first baseline script may be the speech-enabled intelligent script.

In certain embodiments, the obtained information about the actual call flow of each of the communication sessions may comprise a transcript of each of the communication sessions.

In certain embodiments, the system may further comprise a media server. The applications server may be configured to instruct a softswitch to send audio associated with each of the communication sessions to the media server. The media server may be configured to generate the transcript of each of the communication sessions and send the generated transcript of each of the communication sessions to the applications server.

Also disclosed is a method. The method comprises storing a plurality of baseline scripts, each of the plurality of baseline scripts associated with a client of a call center and comprising a plurality of questions for guiding a communication session between an agent and a party. The method further comprises monitoring a plurality of communication sessions, each of the plurality of communication sessions guided by a respective one of the plurality of baseline scripts and obtaining information about an actual call flow of each of the communication sessions. The method further comprises determining, based on an analysis of the obtained information about the actual call flow of each of the communication sessions in relation to each respective associated baseline script, one or more proposed changes to a first baseline script.

In certain embodiments, the method may further comprise modifying the first baseline script based on the one or more proposed changes to the first baseline script.

In certain embodiments, the method may further comprise notifying a client associated with the first baseline script that the one or more proposed changes to the first baseline script are available for review.

In certain embodiments, the method may further comprise receiving, from the client associated with the first baseline script, an instruction to modify the first baseline script based on the one or more proposed changes to the first baseline script. The method may further comprise modifying the first baseline script based on the one or more proposed changes to the first baseline script in response to the received instruction.

In certain embodiments, the one or more proposed changes to the first baseline script may comprise one or more of a question to add to the first baseline script, a question to remove from the first baseline script, a change to one of the plurality of questions in the first baseline script, and a change to an order of presentation of the plurality of questions in the first baseline script.

In certain embodiments, the first baseline script may further comprise one or more possible responses to one or more of the plurality of questions. The one or more proposed changes to the first baseline script may comprise one or more of a possible response to add to the first baseline script, a possible response to remove from the first baseline script, and a change to the one or more possible responses.

In certain embodiments, the analysis of the obtained information about the actual call flow of each of the communication sessions in relation to each respective associated baseline script may comprise an identification of one or more deviations from an associated baseline script during each respective communication session.

In certain embodiments, the method may further comprise generating a new baseline script based on the obtained information about the actual call flow of each of the communication sessions to the analytics engine.

In certain embodiments, the agent may comprise a speech-enabled intelligent script and the first baseline script is the speech-enabled intelligent script.

In certain embodiments, the obtained information about the actual call flow of each of the communication sessions may comprise a transcript of each of the communication sessions.

Certain embodiments of the present disclosure may provide one or more technical advantages. As one example, certain embodiments may advantageously enable call scripts to be created and tailored to individual customers on a continual basis, advantageously reducing or eliminating the need for costly and time-consuming script drafting. As another example, certain embodiments may allow for on-the-fly script adjustments to optimize call flow in real-time. As still another example, certain embodiments may advantageously reduce or eliminate the need for training agents to handle calls that deviate from the call script. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, existing systems for administration of scripts suffer from a number of significant deficiencies and inefficiencies. For example, existing systems require extensive resources to create and modify scripts for specific applications. As another example, existing systems fail to update scripts to optimize call flow in real-time.

The present disclosure contemplates various embodiments that may address these and other deficiencies associated with existing approaches. According to one example embodiment, a system is disclosed. The system comprises a database, the database configured to store a plurality of baseline scripts, each of the plurality of baseline scripts associated with a client of a call center and comprising a plurality of questions for guiding a communication session between an agent and a party. The system further comprises an applications server communicatively coupled to the database and an analytics engine. The applications server may be configured to monitor a plurality of communication sessions, each of the plurality of communication sessions guided by a respective one of the plurality of baseline scripts. The applications server may be further configured to obtain information about an actual call flow of each of the communication sessions and send the obtained information about the actual call flow of each of the communication sessions to the analytics engine. The analytics engine may be configured to determine, based on an analysis of the obtained information about the actual call flow of each of the communication sessions in relation to each respective associated baseline script, one or more proposed changes to a first baseline script.

According to another example embodiment, a method is disclosed. The method comprises storing a plurality of baseline scripts, each of the plurality of baseline scripts associated with a client of a call center and comprising a plurality of questions for guiding a communication session between an agent and a party. The method further comprises monitoring a plurality of communication sessions, each of the plurality of communication sessions guided by a respective one of the plurality of baseline scripts and obtaining information about an actual call flow of each of the communication sessions. The method further comprises determining, based on an analysis of the obtained information about the actual call flow of each of the communication sessions in relation to each respective associated baseline script, one or more proposed changes to a first baseline script.

Figure 1:
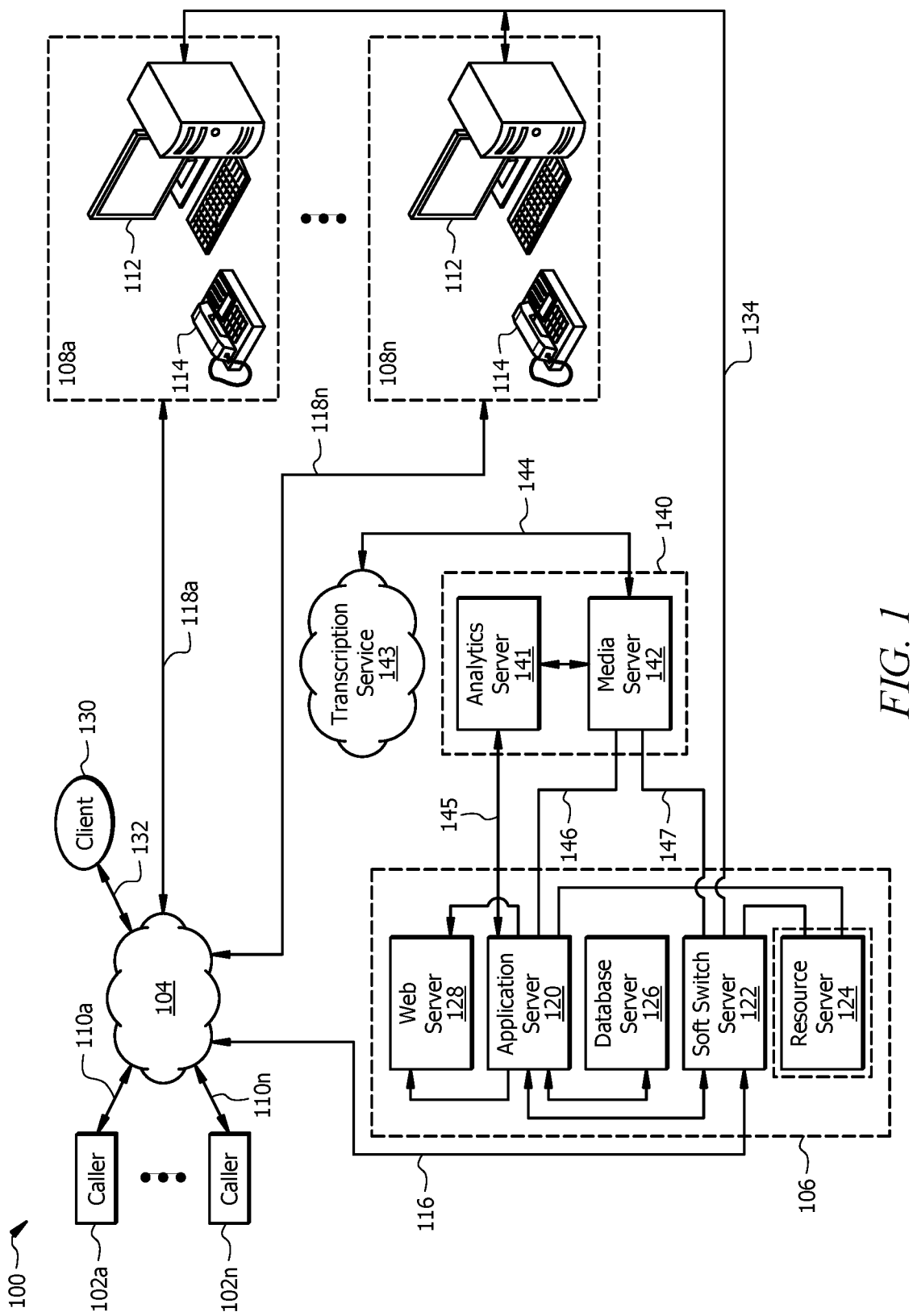
FIG. 1 is a block diagram of an example communication system, in accordance with certain embodiments.

FIG. 1 is a block diagram of an example communication system 100, in accordance with certain embodiments. More particularly, FIG. 1 illustrates communication system 100 comprising one or more callers 102a-102n, a service platform 106, an analytics engine 140, one or more operator stations 108a-108n, and one or more clients 130. Although FIG. 1 illustrates one example of communication system 100, it should be understood that this is for purposes of example only and the present disclosure is not limited to the example communication system of FIG. 1. Rather, the present disclosure contemplates that other embodiments of system 100 may be used without departing from the scope of the present disclosure.

In the example embodiment of FIG. 1, callers 102a-102n, service platform 106, operator stations 108a-108n, and client 130 are coupled to network 104 through various communications links (as described in more detail below). As used throughout this document, the term "couple" and/or "coupled" refers to any direct or indirect communication between two or more elements, whether or not those elements are in physical contact with one another. For example, each caller 102 may use any computing and/or communication device capable of enabling the communication of information to or from one or more of service platform 106, operator stations 108, and client 130 over network 104. Although referred to herein as a caller, it should be understood that callers 102 are not limited to individuals or devices that initiate a telephone call. Rather, the present disclosure contemplates that callers 102 may engage in a variety of types of communication sessions (e.g., telephone calls, video conferencing, text message, or web chat). It should also be understood that a caller 102 is not limited to a party initiating a communication session. For example, callers 102a-102n may be a calling party or a called party that communicates and/or receives data to and/or from service platform 106, operator stations 108, and/or client 130. Each caller 102 may use, for example, a telephone (e.g., a wireline telephone), a wireless device (e.g., a smartphone), a voice over Internet Protocol (IP) device, a desktop computer, a laptop computer, a personal digital assistant (PDA), a workstation, a mainframe computer, a mini-frame computer, a web server, or any other computing and/or communicating device.

Network 104 may comprise any wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

Service platform 106 receives and/or communicates data (e.g., from or to callers 102a-102n, operator stations 108, and/or client 130) through network 104 coupled to service platform 106. In the example of FIG. 1, service platform 106 couples to network 104 through communications link 116. In certain embodiments, service platform 106 operates to collect, store, and/or communicate data to and/or from network 104. In certain embodiments, service platform 106 may be configured to integrate with, for example, telephone carriers and private branch exchange (PBX) equipment to provide a stand-alone, fully functional call-center environment. In some cases, the carrier and PBX integration may be established using a Session Initiation Protocol (SIP) trunk integration method. In operation, service platform 106 may provide a full suite of call-center and enterprise functionality. The various elements of service platform 106 and exemplary functionality of service platform 106 are described in more detail below.

In the example embodiment of FIG. 1, system 100 also includes a plurality of operator stations 108a through 108n. Operator stations 108a through 108n are coupled to service platform 106 through communications link 134. Operator stations 108 are capable of receiving, collecting, storing, and/or communicating data to and/or from network 104. In the example embodiment of FIG. 1, operator stations 108a through 108n are coupled to network 104 through communications links 118a and 118n, respectively.

In certain embodiments, operator stations 108a through 108n may be comprised in a call-center. For example, each operator station 108 may be a live agent-based data collection system capable of collecting data from, for example, caller 102 or client 130. Although operator station 108 is an agent-based system in the example embodiment of FIG. 1, the present disclosure contemplates that other suitable data collection systems may be used without departing from the scope of the present disclosure.

As used herein, the term agent should be interpreted broadly to encompass any individual that caller 102 may be connected to, whether as part of an incoming call from caller 102 routed to service platform 106 or as part of an outgoing call transmitted from service platform 106 to a user (e.g., caller 102). As non-limiting examples, an agent may refer to an agent working in a call-center (e.g., at one of operator stations 108), an employee of an organization associated with service platform 106 and/or operator stations 108, a technician (that may or may not be working remotely from a call-center), speech-enabled intelligent script, or any other suitable person or entity. Although certain embodiments may describe an agent as an operator associated with an operator station 108 in a call-center, the present disclosure is not limited to such an example embodiment. Rather, the various embodiments described herein may be applied to other suitable scenarios, such as those in which operator stations 108 do not make up a traditional call-center (having a plurality of operator stations in one, centralized location). For example, in certain embodiments operator stations 108 may be distributed geographically and may couple to service platform 106 and caller 102 via one or more different networks.

Operator stations 108 may comprise any suitable computing and/or communicating device or combination of devices. In the example embodiment of FIG. 1, each operator station 108 includes a host 112 and a communication device 114. Communication device 114 enables an agent to communicate with caller 102. Communication device 114 may comprise, for example, a telephone, a wireless device, a voice over IP device, or any other computing and/or communicating device or combination of devices. Although the example embodiment of FIG. 1 illustrates host 112 and communication device 114 as separate devices, one device that is capable of performing the desired functionality could be used without departing from the scope of the present disclosure.

Host 112 may comprise, for example, a desktop computer, a laptop computer, a server computer, a personal digital assistant, and/or any other computing or communicating device or combination of devices. In certain embodiments, host 112 may be connected to a PBX-based automated call distribution (ACD) or an ACD of service platform 106. Host 112 may be configured to run software, such as a soft agent. The soft agent may, for example, include a SIP-based soft phone and switch-specific computer telephony integration (CTI) control of the agent state during call handling. The soft agent may provide an interface to service platform 106, and in particular to applications server 120 and softswitch server 122 of service platform 106. Host 112 may include a graphical user interface (GUI) that enables a live agent to collect, enter, process, store, retrieve, display, amend, and/or dispatch data during the interaction of operator station 108 with a user of caller 102 or client 130 (e.g., during a call). Host 112 may run console software that provides, for example, IP-based call handling using the GUI and, for example, an input device (such as a mouse, keyboard, microphone, or other suitable input device). Each host 112 may be capable of executing and/or displaying one or more intelligent scripts and/or other types of scripts that at least partially contribute to the collection of data from caller 102. As described below, an intelligent script may guide call-center agents through call completion steps.

Client 130 may be associated with a business or other entity that has engaged a call-center to manage incoming and/or outgoing calls. In the example of FIG. 1, client 130 is coupled to network 104 through communications link 132. Like caller 102 described above, client 130 may use any computing and/or communication device capable of enabling the communication of information to or from one or more of service platform 106, operator stations 108, and callers 102 over network 104. For example, client 130 may use a telephone (e.g., a wireline telephone), a wireless device (e.g., a smartphone), a voice over IP device, a desktop computer, a laptop computer, a PDA, a workstation, a mainframe computer, a mini-frame computer, a web server, or any other computing and/or communicating device.

As noted above, in the example embodiment of FIG. 1 callers 102a-102n, service platform 106, operator stations 108-108n, and client 130 are coupled to network 104 through various communications links. More particularly, system 100 includes communications links 110, 116, 118, 132 and 134, each operable to facilitate the communication of data to and/or from network 104. Likewise, system 100 includes communication links 144, 145, 146, and 147, each operable to facilitate the communication of data to and/or from analytics engine 140. Communications links 110, 116, 118, 132, 134, 144, 145, 146, and 147 may include any hardware, software, firmware, or combination thereof. In various embodiments, communications links 110, 116, 118, 132, 134, 144, 145, 146, and 147 may comprise communications media capable of assisting in the communication of analog and/or digital signals. Communications links 110, 116, 118, 132, 134, 144, 145, 146, and 147 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information.

Data may be transmitted over communications links 110, 116, 118, 132, 134, 144, 145, 146, and 147 using any suitable protocol. As non-limiting examples, protocols such as the Real-time Transport Protocol (RTP) and WebRTC may be used. RTP is a network protocol for delivering audio and video over IP networks via streaming. WebRTC is an open framework for the web that enables high quality real-time communication sessions over a network. WebRTC allows for the streaming of audio and/or video media without requiring an intermediary or third-party software. RTP and WebRTC may be particularly useful in the various embodiments described herein, because they can advantageously allow for the receipt of real-time data from the communication session between caller 102 and an agent associated with an operator station 108, if desired.

As noted above, service platform 106 may provide a full suite of call-center and enterprise functionality. Service platform 106 may comprise any suitable combination of hardware, software, and/or firmware. In certain embodiments, service platform 106 may comprise any device or combination of devices that may include one or more software and/or firmware modules. In the example embodiment of FIG. 1, service platform 106 includes an applications server 120, a softswitch server 122, a resource server 124, a database server 126, and a web server 128. Although FIG. 1 illustrates a particular arrangement of elements of service platform 106, it should be understood that the present disclosure is not limited to the precise arrangement of the example embodiment of FIG. 1. For example, although FIG. 1 illustrates an example embodiment in which applications server 120, softswitch server 122, resource server 124, database server 126, and web server 128 are incorporated into a single device, the present disclosure is not limited to this example embodiment. In certain embodiments, the elements of service platform 106 may be distributed. In certain embodiments, service platform 106 may contain fewer components than those illustrated in the example embodiment of FIG. 1. For example, In certain embodiments, the functions of resource server 124 may be performed by media server 142, explained in greater detail below with respect to analytics engine 140. Additionally, in certain embodiments service platform 106 may contain any suitable additional components that may provide one or more of the functionalities described herein and/or additional functionality to service platform 106.

Applications server 120 may house one or more applications used by service platform 106. In certain embodiments, applications server 120 may provide a full suite of call-center and enterprise applications. Exemplary call-center and enterprise applications provided by applications server 120 are described in more detail below. Softswitch server 122 is coupled to applications server 120 and resource server 124 in the example embodiment of FIG. 1. Softswitch server 122 may house the switching components of service platform 106. For example, softswitch server 122 may include a softswitch. In certain embodiments, the softswitch may be a SIP-based telephony switch. The softswitch may receive inbound phone calls (e.g., from callers 102) and send outgoing call requests (e.g., outbound calls from operator stations 108). The softswitch may provide telephony services to, for example, IP subscribers and traditional PSTN subscribers, for example by supplying the trunking between the IP and PSTN networks. Softswitch server 122 may operate in tandem with one or more of applications server 120, resource server 124, database server 126, web server 128, and media server 142 to provide voice processing and switching resources. For example, softswitch server 122 may provide one or more of intelligent call routing, switch-based configurable call control, multi-lingual voice processing resources, and other suitable functionality. In certain embodiments, softswitch 122 may stream audio or video to media server 142 for processing (for example, using the speech recognition functionality of media server 142, described in more detail below).

In the example embodiment of FIG. 1, resource server 124 is coupled to applications server 120 and softswitch server 122. In certain embodiments, resource server 124 may operate in tandem with one or more of applications server 120, softswitch server 122, database server 126, and web server 128 to provide voice processing resources for service platform 106. For example, resource server 124 may provide a speech recognition engine and voice resources for service platform 106. Resource server 124 may include an automatic speech recognition (ASR) engine capable of processing voice responses, natural language processing, text-to-speech translations, and/or speech-to-text translations in connection with one or more voice-enabled functions of service platform 106. In certain embodiments, resource server 124 can be configured to use one or more customizable grammars to match spoken phrases to, for example, directory listings. Resource server 124 may be configured to receive audio from softswitch server 122 for processing using the speech-recognition functionalities described above. In certain embodiments, some or all of the functionality described above as performed by resource server 124 may be performed by media server 142.

Database server 126 is coupled to applications server 120. Database server 126 may store information utilized by one or more other elements of service platform 106 (such as applications server 120, softswitch server 122, resource server 124, and web server 128) or analytics engine 140 (such as analytics server 141 and media server 142). For example, database server 126 may store one or more of speech-enabled intelligent scripts, intelligent scripts, scripts, prompts, information associated with a caller 102 (e.g., called or calling party), selections and data inputs from caller 102, recorded audio, transcripts of communication sessions, speech recognition patterns, and any other suitable information. In certain embodiments, database server 126 may use an SQL server database engine for database management, storage, and retrieval. Database server 126 may include memory capable of storing one or more scripts (e.g., speech-enabled intelligent scripts and intelligent scripts), data associated with a caller's response or responses, information related to previous interactions between a caller and service platform 106 and/or a caller and an agent, and/or any other suitable information. The memory may include any hardware, software, firmware, or combination thereof operable to store and facilitate retrieval of information. The memory may store information using any of a variety of data structures, arrangements, and/or compilations. The memory may, for example, include a dynamic random-access memory (DRAM), a static random-access memory (SRAM), a NAND flash memory, or any other suitable volatile or nonvolatile storage and retrieval device or combination of devices.

Data stored in database server 126 may be accessible by multiple components of service platform 106 and/or operator stations 108 (including, for example, host 112 described in more detail below). For example, the data stored in database 126 may be accessible to one or more of applications server 120, softswitch server 122, resource server 124, web server 128, and host 112. Storing data in a memory that is accessible to multiple elements of system 100 can prove advantageous when it is desired to subsequently access and process this information. In certain embodiments, analytics server 141 and/or media server 142 may directly and/or indirectly (e.g., via applications server 120) access the data stored in database server 126. In certain embodiments, data stored in database server 126 can be used to populate a speech-enabled intelligent script, an intelligent script, and/or any other type of script used by applications server 120 and/or an agent associated with an operator station 108. Populating scripts with data stored in database 126 can help the intelligent speech-enabled scripts (or an agent using an intelligent scripts) to interact more efficiently with a caller 102. For example, populating a speech-enabled intelligent script and/or a script used by a live agent with data from database 126 allows the intelligent speech-enabled script or the agent or operator to review the responses previously provided, which may allow the agent to better assist a caller 102.

Web server 128 provides the web services for service platform 106. In certain embodiments, web server 128 may provide access to the data stored in database server 126 (e.g., directly and/or indirectly). For example, in some implementations web server 128 may provide direct access to the data stored in database server 128. Additionally or alternatively, in some implementations web server 128 may provide indirect access to database server 126 (e.g., through applications server 120). In certain embodiments, web server 128 may provide direct access to the information stored in analytics server 141. Additionally or alternatively, in certain embodiments web server 128 may provide indirect access to the information stored in analytics server 141 (e.g., through applications server 120). Web server 128 may provide administrative, monitoring, and reporting tools for the information stored in the database server 126 and/or analytics server 141.

In certain embodiments, service platform 106 may include all or some suitable combination of the servers described above, as well as (alternatively or in addition to) other elements configured to perform desired communicating and/or computing functionality.

Each of applications server 120, softswitch server 122, resource server 124, database server 126, and web server 128 may comprise any suitable combination of hardware, software, and firmware. In certain embodiments, one or more of applications server 120, softswitch server 122, resource server 124, database server 126, and web server 128 may include processing circuitry, such as a combination of one or more of a controller, microprocessor, microcontroller, central processing unit, digital signal processor, application-specific integrated circuit, field programmable gate array, or any other suitable computing device, resource, or combination of hardware, software, and/or encoded logic operable to provide the functionality described herein. The processing circuitry may execute instructions stored in device readable medium or in memory to provide the functionality described herein. Applications server 120, softswitch server 122, resource server 124, database server 126, and web server 128 may comprise any form of volatile or non-volatile computer readable memory including, for example, persistent storage, solid-state memory, remotely mounted memory, magnetic media, optical media, random access memory (RAM), read-only memory (ROM), mass storage media (for example, a hard disk), removable storage media (e.g., a flash drive, a Compact Disk (CD) or a Digital Video Disk (DVD)), and/or any other volatile, non-transitory device readable and/or computer executable memory devices that store information, data, and/or instructions that may be used by the processing circuitry. The memory may store any suitable instructions, data or information, including a computer program, software, an application including one or more of logic, rules, code, tables, etc. and/or other instructions capable of being executed by the processing circuitry to perform the various functionalities described herein. The memory may store responses written to memory by a script, such as an intelligent script or speech-enabled intelligent script. In some cases, the processing circuitry and device readable medium may be considered to be integrated.

In certain embodiments, one or more of applications server 120, softswitch server 122, resource server 124, database server 126, and web server 128 may run on dedicated servers. In other embodiments, one or more of applications server 120, softswitch server 122, resource server 124, database server 126, and web server 128 may run in a virtual server environment. Running applications server 120, softswitch server 122, resource server 124, database server 126, and web server 128 in a virtual server deployment may advantageously reduce the number of servers needed and provide greater flexibility in terms of redundancy and ease of deployment.

As noted above, applications server 120 may house one or more applications used by service platform 106 to provide a full suite of call-center and enterprise applications. For example, applications server 120 may provide for ACD, such as skills-based routing ACD. This may advantageously enable service platform 106 to provide for functionality such as priority call routing, overflow, integral voice processing, reporting, and server-based PBX integration. In certain embodiments, applications server 120 may determine how incoming and/or outgoing calls should be routed and provide instructions to softswitch server 122 to route calls in a particular manner.

As another example, applications server 120 may provide various voice services (alone or in combinations with, for example, one or more of softswitch server 122, resource serve 122, and media server 142). For instance, applications server 120 may provide call-center functions such as playing greetings to callers with multi-level navigation menus, playing automated call queuing announcements, playing automated agent greetings, automated call recording and playback, and other suitable functions. In certain embodiments, applications server 120 may provide for automated outbound phone calls (e.g., calls to one or more of callers 102) with messages played using integrated text-to-speech.

As yet another example, applications server 120 may provide scripting functionality (e.g., intelligent scripting and/or speech-enabled intelligent scripting functionality). An intelligent script guides users (e.g., an agent) through call completion steps, workflow steps, and messaging steps. Intelligent scripts can be built for call-center agents, operators, and web and mobile users. Similarly, intelligent scripts guide call-center agents through call completion steps. In certain embodiments, an intelligent script presents the appropriate options for each call type an agent handles, eliminating errors and reducing training time.

Intelligent scripts may contain any number of elements, actions, and screens. In certain embodiments, a script designer enables an administrator (e.g., a call-center administrator) to create any number of intelligent scripts. Each script may have a unique flow to present the elements, actions, and screens in the preferred order for each scenario.

Branching and decision trees may be available within the scripts to customize the flow of elements based on selections, date/time, or data. In one particular non-limiting example, a script may comprise one or more questions requesting information and/or data from a user (e.g., caller 102) of service platform 106. In other cases, a script may further comprise one or more possible responses to the one or more questions. In certain embodiments, the possible responses are based on data collected from a previous communication session with caller 102. In some cases, intelligent scripts may include, for example, an HTML-based script, an XML-based script, a JSON-based script, or a combination of these or other scripting formats. Intelligent scripts may comprise, for example, software, firmware, code, portions of code, data compilations, and/or a combination of these or any other type of data. In a preferred embodiment, applications server 120 is operatively coupled to an analytics engine 140, with communication link 145, to determine and provide proposed changes to the scripts based on analysis of information about the actual call flow of one or more communication sessions, as described in more detail below.

Speech-enabled intelligent scripts enable users (e.g., caller 102) to interact with intelligent scripts without agent involvement. For example, phone users may be guided through scripts using pre-recorded prompts, voice menus, and text-to-speech menus. Phone users make selections and input data (e.g., using Dual Tone—Multi Frequency (DTMF) entry or speech recognition entry). In certain embodiments, the entire intelligent script may be speech-enabled. In certain embodiments, the script designer may enable the administrator to choose which entries are to be speech-enabled. In certain embodiments, the speech-enabled intelligent script (or a section thereof) may include prompts and/or questions similar to those in the intelligent script provided to the agent had one been available. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on analysis and/or proposed changes received from analytics engine 140. The present disclosure contemplates that the procedures described herein could be applied to any suitable type of script, including but not limited to: a call script (e.g., a static script used by a live-agent), an intelligent script, and/or a speech-enabled intelligent script.

Creating and administering scripts tailored to a customer's needs is a time-consuming and resource intensive activity. In existing systems, scripts are rarely updated unless a customer complains. As a consequence, most scripts are left unoptimized, leading to unnecessary costs to client 130. The present disclosure addresses this challenge by providing an intelligent scripting engine. As one nonlimiting example, a baseline script (e.g. a script subject to optimization by analytics engine 140) is stored on database server 126. Applications server 120 may monitor a plurality of communication sessions between an agent and caller 102 and send data about the plurality of communication sessions to analytics engine 140 (e.g. data about communication sessions between an agent and the customers of a particular client for a determined time period). Applications server 120 may send the audio of each communication session to analytics engine 140 for analysis. Analytics engine 140 may convert the audio into text for easier analysis using media server 142. Analytics engine 140 may compare the text of the plurality of communication sessions to the associated baseline script to identify deviations (e.g. differences between the flow of the analyzed communication session and the baseline script). Analytics engine 140 may use the identified deviations as inputs to an artificial intelligence model to determine proposed changes predicted to optimize the baseline script. Based on its analysis, analytics engine 140 may generate a new baseline script that is optimized to the goals of client 130.

It is also difficult to modify scripts in response to unexpected customer actions in real-time to maintain the desired call flow. In existing systems, agents must respond to unexpected deviations from the call script on their own. In existing systems, to maintain call consistency and quality in these scenarios, additional training for agents may be necessary. In one nonlimiting example, the present disclosure addresses this deficiency in existing systems by modifying scripts in real-time based on deviations in the call flow from the optimized baseline script. As one nonlimiting example, an agent of a call center begins a communication session with a caller 102. The communication session may be scripted using a baseline script optimized by analytics engine 140. Data about the communication session may be streamed in real time to analytics engine 140. If the communication session between the agent and caller 102 deviates from the baseline script, analytics engine 140 may determine changes to the baseline script in real-time that are determined by analytics engine 140 to return the communication session to the desired call flow. Analytics engine 140 may send the proposed changes to applications server 120 for use by the agent in real-time.

Analytics engine 140 may be operatively coupled to applications server 120 through communications links 145 and 146. Analytics engine 140 may comprise analytics server 141 and media server 142. Analytics engine 140 may provide a variety of script recommendation and analysis functionality. For example, as will be discussed in greater detail below, applications server 120 may be configured to monitor and obtain information about the actual call flow of the communications sessions. Applications server 120 may be configured to send the obtained information to analytics engine 140 along with the associated baseline script. In certain embodiments, a baseline script is a script that has been created and is subject to optimization by analytics engine 140.

In the example embodiment of FIG. 1, analytics engine 140 includes an analytics server 141 and a media server 142. Although FIG. 1 illustrates a particular arrangement of elements of analytics engine 140, it should be understood that the present disclosure is not limited to the precise arrangement of the example embodiment of FIG. 1. For example, although FIG. 1 illustrates an example embodiment in which the analytics server 141 and media server 142 are located in the same device, the present disclosure is not limited to this example embodiment. In certain embodiments, the elements of analytics engine 140 may be distributed. In certain embodiments, analytics engine 140 may contain fewer components than those illustrated in the example embodiment of FIG. 1. Additionally, in certain embodiments analytics engine 140 may contain any suitable additional components that may provide one or more of the functionalities described herein and/or additional functionality of analytics engine 140. In a preferred embodiment, analytics engine 140 is cloud-based.

Analytics server 141 is coupled to applications server 120 using communications link 145 and media server 142. Analytics server 141 receives information about the actual call flow of the communication session from applications server 120. The information about the actual call flow of the communication session may include transcripts of the communication session, audio or visual recordings of the communication session, information about dispatches, notes taken by the agent or an auditing client, information about prior communication sessions with the customer, or any other relevant information about the actual call flow of the communication session. Analytics server 141 may also receive the baseline script associated with the communication session from the database server 126 via the applications server 120. As will be explained in greater detail below, the analytics server 141 may use an artificial intelligence model to analyze the information about the actual call flow of the communication session and determine proposed changes to an associated baseline script.

In the example embodiment of FIG. 1, media server 142 is coupled to applications server 120, softswitch server 122, and transcription service 143. Media server 142 may be configured to receive streamed audio or video data about the communication session from softswitch server 122. In certain embodiments, media server 142 receives a stream of audio data from the softswitch server 122 and sends it to transcription service 143 for transcription over communication link 144. When media server 142 receives the transcript from transcription service 143, it may send the transcript to one or more of applications server 120 using communications link 146 and analytics server 141. In certain embodiments, media server 142 may not send data to transcription service 143 and instead processes the data itself. For example, media server 142 may provide a speech recognition engine and voice resources for service platform 106 and analytics engine 140. Media server 142 may include an automatic speech recognition (ASR) engine capable of processing voice responses, natural language processing, text-to-speech translations, and/or speech-to-text translations in connection with one or more voice-enabled functions of service platform 106 and analytics engine 140. For example, media server 142 may convert text to audio and send the audio to softswitch server 122 for playback. As discussed above, in certain embodiments media server 142 may replace resource server 124 and provide similar functionality.

In certain embodiments, media server 142 (alone or operating in combination with transcription service 143) is configured to generate a transcript of each of the communication sessions and send the generated transcript of each of the communication sessions to one or more applications server 120 and analytics server 141. In certain embodiments, the generation of the transcript and the sending of the generated transcript may occur simultaneously and in real-time.

In operation, in certain embodiments, applications server 120 may be configured to monitor a plurality of communication sessions established between an agent (e.g., an agent associated with an operator station 108) and a caller 102. The communication session may be an audio and/or video communication session (e.g., a telephone call or video conference). As another example, the communication session may be a written communication session (e.g., over text message or web chat). As still another example, the communication session may be a communication session established between a caller 102 and a speech-enabled intelligent script.

In certain embodiments, applications server 120 may be configured to obtain information about the actual call flow of each communication session. For example, applications server 120 may be configured to obtain information about the actual call flow between an agent (e.g., an agent associated with an operator station 108) and a caller 102. The information about the actual call flow may be one or more of a transcript of the communication session (e.g., a transcript of all or a portion of the communication session), audio or visual recordings of the communication session, information about dispatches, notes taken by the agent or an auditing client, information about prior communication sessions with the caller, or any other relevant information.

In certain embodiments, applications server 120 may be configured to send the obtained information about the actual call flow of each of the communication sessions to analytics engine 140 using communications link 145. For example, applications server 120 may be configured to stream obtained information about the actual call flow of the communication session in real-time to analytics engine 140. In other cases, the applications server 120 may send the obtained information about the actual call flow of the communication session to analytics engine 140 once the communication session has ended. In still other cases, application server 120 may send the information about the actual call flow of the communication session to analytics engine 140 at a designated time, such as during a period of low call volume. This may advantageously free up bandwidth for the call-center during peak times. In certain embodiments, the data may be sent in a binary format, such as Protobuff or any other binary format. In other cases, the data may be sent in a JSON format or any other suitable format.

Analytics engine 140 may provide a variety of script recommendation and analysis functionality. For example, in certain embodiments, analytics engine 140 is configured to determine, based on an analysis of the obtained information about the actual call flow of each of the communication sessions in relation to each respective associated baseline scripts, one or more proposed changes to a baseline script. In certain embodiments, the baseline script may be an intelligent script. In certain embodiments, the baseline script may be a speech-enabled intelligent script.

The present disclosure contemplates that analytics engine 140 may be configured to determine the proposed changes to the baseline scripts in a variety of ways. In certain embodiments, analytics engine 140 uses artificial intelligence models to determine the proposed changes to the baseline scripts. Accordingly, described below are exemplary and nonlimiting examples of artificial intelligence models, input variables, and output variables that may be used to create an artificial intelligence model capable of determining proposed changes to a baseline script in accordance with the teachings of this disclosure.

Non-limiting examples of artificial intelligence models that may be used by analytics engine 140 are a linear regression (SLR) model, a naïve bayes model, or a deep neural network (DNN). Analytics engine 140 may use any suitable artificial intelligence model for determining proposed changes to the baseline script associated with the information being analyzed. The artificial intelligence models may be created by applying associated algorithms to a set of training data with identified input and output variables.

In certain embodiments the training data set used to create the artificial intelligence model used by analytics engine 140 is collected from client 130. For example, the training data set may include transcripts of communication sessions between agents and callers. The training data set may additionally include any relevant data collected and stored on database server 126. In other embodiments, the training data set used to create the artificial intelligence model used by analytics engine 140 may be collected from multiple clients. For example, analytics engine 140 may use a model created using a training data set which includes data from all clients in a particular category or field. This may advantageously allow for a more robust data set to be used to create the model used by analytics engine 140 (generally the more data in a training data set, the more accurate an artificial intelligence model becomes).

In certain embodiments, the input variables used to create the artificial intelligence model used by analytics engine 140 may be words, phrases, questions, or answers from one or more transcripts of communication sessions in the training data set. For example, the phrasing of a question used by an agent during the communication session may be an input variable. As another example, the order of questions used to collect information from caller 102 may be an input variable. As yet another example, the one or more potential responses to the one or more questions may be input variables. In certain embodiments, the input variables are identified and organized in advance such that the training data set is structured. In other embodiments, the training data set may be unstructured. In this scenario, natural language processing may be used to identify input variables from the unstructured training data set.

In certain embodiments, analytics engine 140 analyzes input variables from a predefined set. In other cases, analytics engine 140 identifies deviations from the baseline script and uses the one or more deviations from the baseline script as input variables. In still other cases, analytics engine 140 uses natural language processing to create input variables independently of a predefined set or deviations from the baseline script. In certain embodiments, the input variables may include a combination of the one or more of various examples of input variables described herein.

In certain embodiments, the output variables used to train the artificial intelligence model used by analytics engine 140 may be actual call flow information about the one or more communication sessions in the training data set. For example, the following is a non-exhaustive and nonlimiting list of possible output variables that may be used to train the artificial intelligence model used by analytics engine 140:

Total Call Time;
Customer Satisfaction;
Agent Satisfaction;
Client Satisfaction;
Conversion Rate;
Amount of Information Collected;
Total Cost to Client;
Audio Call Transcription Text;
Audio Call Transcription Text Variation from Baseline Script;
Call Flow Deviations from Baseline Script;
Caller Emotion; and/or
Call Disposition (e.g., the final outcome of the call).

As discussed above, one non-limiting example of a model for determining proposed changes to the baseline scripts is a SLR model. Analytics engine 140, through analytics server 141, may process the obtained information about the actual call flow of a communication session using a SLR model. SLR is a form of linear regression used when there is a single input variable for the output variable. Using an SLR model, analytics engine 140 may determine the effect of one input variable (e.g., the phrasing of a question the agent asks caller 102) on one output variable (e.g., total call time). For example, client 130 may desire to optimize the baseline scripts to result in the shortest total call time to reach more callers 102. Processing the information about actual call flow using an SLR model, analytics engine 140 may predict the effect the phrasing of different questions used by an agent on the total call time and determine which phrasing is most likely to lead to a shorter total call time. As a result, analytics engine may propose a change to the baseline script to reflect the question phrasing most likely to result in the shortest total call time.

As another non-limiting example, analytics engine 140 may process the obtained information about an actual call flow of a communication session using a naïve bayes model. Analytics engine 140, through analytics server 141, may process the obtained information about the actual call flow of a communication session using a naïve bayes model. In contrast to an SLR model, the naïve bayes model is capable of using multiple independent variables to predict an output variable. Continuing the example from above, analytics engine 140 may predict the effect of the phrasing of multiple questions used by an agent on the total call time and determine which combination of question phrasing is likely to lead to the shortest total call time.

As yet another non-limiting example, analytics engine 140 may process the obtained information about an actual call flow of a communication session using a deep neural network (DNN) model. A neural network is a model built to simulate the pattern recognition ability of the human brain using the passage of an input through layers of simulated neural connections. A deep neural network is a neural network with more than two layers of simulated neural connections. Each layer performs specific types of sorting and ordering. Using a DNN may advantageously allow for the processing of data which has complex patterns.

The present disclosure contemplates that analytics engine 140 may predict the effect of any one or more relevant input variables to any one or more relevant output variables to determine proposed changes to the associated baseline script. As one nonlimiting example, analytics engine 140 may predict the effect the phrasing of different questions may have on caller satisfaction, caller emotion, and/or call disposition. As another nonlimiting example, analytics engine 140 may predict the effect of changing the order of questions on caller satisfaction, caller emotion, and/or call disposition. As yet another nonlimiting example, analytics engine 140 may predict the effect of adding questions or script branching based on new questions posed by a caller that are not currently part of the baseline script on one or more output variables. It should be understood that these are merely examples, and that analytics engine 140 may predict the effect of one or more input variables (e.g., a combination of input variables) on one or more output variables to determine proposed changes to the associated baseline script.

In certain embodiments, the analytics engine 140 is configured to send one or more proposed changes to a baseline script to applications server 120.

In certain embodiments, the analysis of the obtained information about the actual call flow of each of the communication sessions in relation to each respective associated baseline scripts conducted by analytics engine 140 comprises an identification of one or more deviations from an associated baseline script during each respective communication session. In certain embodiments, the identified deviations may be used as an input variable to the artificial intelligence model used by analytics engine 140 to determine proposed changes to baseline scripts.

In certain embodiments, the analytics engine 140 is configured to generate a new baseline script based on the obtained information about the actual call flow of each of the communication sessions to the analytics engine. In certain embodiments, the analytics engine 140 is configured to generate a new baseline script based on inputs about a customer's business and needs. For example, analytics engine 140 may be configured to generate a new baseline script based on one or more of: a client's type of business, client's size of business, information needed by the client, geographic area served by the client, client's specialty, client's budget for calls, or other preference data from the client. As one nonlimiting example, analytics engine may be configured to generate a new baseline script for a client in the plumbing business who needs to collect the name, location, and plumbing issues of his potential customers. Analytics engine 140 may be further configured to use the business geographic location (e.g. region, state, or city) to tailor the script to the speaking patterns of potential customers of the client. In certain embodiments, the modified baseline script becomes a new baseline script. In certain embodiments, the new baseline script is stored on database server 126.

In certain embodiments, applications server 120 may be configured to modify a baseline script based on one or more proposed changes to the baseline script. For example, analytics engine 140 may determine proposed changes to the baseline script and send the proposed changes to applications server 120. Applications server 120 may modify the baseline script based on the received proposed changes from analytics engine 140 in real-time. As another example, applications server 120 may modify the baseline script after receiving instructions from client 130. In certain embodiments, the modified script may become the new baseline script and be stored in database server 126.

The present disclosure contemplates that applications server 120 may be configured to modify the baseline script in a variety of ways. For example, the proposed changes from analytics engine 140, and therefore the modifications to the baseline script made by applications server 120, may add one or more questions, remove one or more questions, and/or modify one or more questions in the baseline script. In embodiments where the baseline script includes answers and/or responses (e.g., a dropdown menu with potential answers to a question for an agent to select from based on a caller's response), the proposed changes may include changes to the answers and/or responses. For example, the proposed changes may include adding one or more answers, removing one or more answers, or modifying one or more answers in the baseline script.

In certain embodiments, analytics server 141 and/or applications server 120 may monitor or be provided information about the skill level of one or more agents.

For example, analytics server 141 may analyze communication sessions involving one or more agents for the ability to stay on script, reach a favorable call disposition, and/or any other relevant metric. Based on this analysis, analytics engine 141 may determine an agent's skill level. As another example, information about agent skill level may be provided on database server 126 and thus be accessible either directly or indirectly by applications server 120 and/or analytics server 141. As yet another nonlimiting example, the agent's skill level may be rated on a five-star scale with one star being a lower level of skill and 5 stars being a higher level of skill.

In certain embodiments, applications server 120 may determine the difficulty level of a script after it is modified. For example, applications server 120 may analyze the script's length, complexity, and/or any other relevant metric.

Based on this analysis, applications server 120 may determine the script difficulty. As one nonlimiting example, applications server 120 and/or analytics server 141 may use a five-star scale for indicating the difficulty of a script with one star being a lower level of difficulty and 5 stars being a higher level of difficulty. In other embodiments, applications server 120 may determine the difficulty level of a script before the script is modified using the same analysis described above. In this case, analytics server 141 may be configured to predict the change in difficulty based on its proposed modifications and automatically update the script's difficulty rating. For example, analytics server 141 may determine that based on its proposed changes, the new script should be rated one star less difficult. As another example, analytics server 141 may determine that based on its proposed changes, the new script should be rated one star more difficult. In certain embodiments, the analytics server 141 may automatically update the difficulty level of the script. In other cases, the analytics server 141 sends its predicted difficulty level to applications server 120 as an additional proposed modification to the baseline script.

In certain embodiments, applications server 120 may direct communication sessions associated with a script rated with a high difficulty level only to those agents with a high skill level. For example, applications server 120 may direct a communication session rated as a four-star difficulty to an agent only if the agent has a four-star skill level or above. In other embodiments, applications server 120 may prioritize assigning communication sessions associated with high difficulty scripts to agents with a high skill level. In certain embodiments, applications server 120 may direct communication sessions associated with a script rated with a low difficulty level only to those agents with a low skill level. In other embodiments, applications server 120 may prioritize assigning communications sessions associated with low difficulty scripts to agents with a low skill level.

Although certain exemplary embodiments have been described above in the context of scoring the difficulty of scripts and the skill of agents on a five-star scale, the present disclosure is not limited to these example embodiments. Rather, the present disclosure contemplates that the various embodiments described herein may use any suitable scoring and/or rating system for indicating script difficulty and agent skill level.

In certain embodiments, applications server 120 may be configured to notify a client associated with the baseline script that one or more proposed changes to the baseline script are available for review. In certain embodiments, applications server 120 may be configured to send the notification to client 130 without agent intervention. For example, upon receiving one or more proposed changes from analytics engine 140, applications server 120 may automatically cause a notification to be sent to client 130. In certain embodiments, the notification appears in an interface used to manage scripts (e.g., a script designer). Such an approach may be particularly advantageous when the monitored communication session is between a caller 102 and a speech-enabled intelligent script (which may be carried out without agent involvement). In certain embodiments, applications server 120 may be configured to notify an agent that one or more proposed changes have been received from analytics engine 140. In such a scenario, the agent may initiate sending the notification to client 130.

In certain embodiments, applications server 120 may be configured to send a notification to client 130 in response to receiving one or more proposed changes to the baseline script from analytics engine 140. In certain embodiments, applications server 120 may be configured to send a notification to client 130 when a threshold number of proposed changes have been received from analytics engine 140. In certain embodiments, applications server may be configured to send a notification to client 130 at a predetermined time as long as at least one proposed change has been received from analytics engine 140.

The notification may include a variety of information and may take a variety of forms, both of which may vary depending on particular implementations. In certain embodiments the notification may take the form of a redline of the baseline script. For example, additions to the baseline script may appear alongside the existing portions of the baseline script in underline and portions proposed for deletion may appear as struck-through text. As another example, material to be added may be indicated by a particular color (e.g. green) and material to be removed may appear as another color (e.g. red). In other embodiments, the notification may be in narrative form. In certain embodiments, the notification may be one or more of a text message, an email, a push alert, a pop-up, and a paging message. In certain embodiments, the notification may appear in a script designer or other software used to create and manage scripts. In some cases, applications server 120 may cause more than one notification to be sent (e.g., a text message and an appearance in the script designer) in order to increase the likelihood that client 130 receives the notification.

In certain embodiments, applications server 120 may determine whether a proposed change requires notifying client 130 for approval using predictive intelligence functionality and only notify client 130 about the one or more proposed changes if it is determined to be necessary. For instance, in certain embodiments, database server 126 may be configured to store information about the notification and/or approval preferences of client 130. The information may include, for example, information about previously proposed changes, such as the type of proposed change or whether a similar proposed change was ultimately approved or denied by client 130. Database server 126 may store other suitable information about previous communication sessions, including other types of call analytics such as duration, disposition, identifying information about a caller 102, the type of communication session, or any other suitable information.

Applications server 120 may be configured to use the information about previous communication sessions to self-learn and adjust how proposed changes are processed. Applications server 120 may also be configured to pass this information to analytics engine 140 for analysis. Applications server 120, employing predictive intelligence functionality, may be configured to use one or more of the various information sources described above to predict a preferred behaviour for subsequent proposed changes. For example, applications server 120 may determine based on information about previous communication sessions and the stored notification/approval preferences of client 130, that no notification or approval is necessary for a proposed change to the baseline script if client 130 has indicated a preference that notification/approval is not required for a specific type of change. In this scenario, applications server 120 may implement the proposed change without further instruction from client 130. As another example, applications sever 120 may determine, based on information about previous communication sessions and the stored notification/approval preferences of client 130, that a notification should be sent for a proposed change to the baseline script to receive the approval of client 130. In this scenario, applications server 120 will not implement the proposed change until further instruction is received from client 130. By using predictive intelligence functionality, applications server 120 may advantageously tailor the notification and approval of proposed changes to the baseline scripts to the preferences of client 130.

In certain embodiments, the notification to client 130 indicates the baseline script to be modified, the proposed change to the baseline script, and the reason for the proposed change. In other cases, more or less information may be included in the notification to client 130. In certain embodiments, the client 130 is presented with a plurality of proposed changes to choose from. For example, in certain embodiments, analytics engine 140 determines multiple proposed changes to the same baseline script and sends them to applications server 120. In certain embodiments the plurality of proposed changes are predicted to give the same level of optimization to the baseline script. Applications server 120 sends a notification to client 130 containing the plurality of proposed changes and client 130 selects which of the proposed changes to implement. Client 130 then sends instructions to modify the baseline script back to applications server 120 which implements the proposed changes selected by client 130.

In certain embodiments, applications server 120 may be configured to stream information about the actual call flow of the communication session to analytics engine 140. The information about actual call flow may include transcripts of the communication session, audio or visual recordings of the communication session, information about dispatches, notes taken by the agent or an auditing client, information about prior communication sessions with the customer, or any other relevant information about the actual call flow of the communication session. In certain embodiments, once a communication session is established between an agent associated with an operator station 108 and a caller 102, applications server 120 may stream the information about the actual call flow of the communication session to analytics engine 140 in real-time.

During busy times of the year for call centers, the number of callers trying to call-in may exceed the number of agents who are available to take calls. This leads to long wait times for customers at best and lost revenue for the call center at worst. One nonlimiting embodiment of the present disclosure addresses this issue by processing calls using speech-enabled intelligent scripts and analytics engine 140. For example, analytics engine 140 may receive information about special events associated with a particular day (e.g. a holiday), traffic in the system, client calls coming into the system, and other caller data (e.g. whether the caller has paid for premium service). Based on this information, analytics engine 140 may assist application server 120 in making decisions about how to route calls. To alleviate long wait times, analytics engine 140 may direct some callers to a speech-enabled intelligent script for processing rather than a human agent.

In certain embodiments, analytics engine 140 may direct any callers in excess of the number of available agents to a speech-enabled intelligent script. For example, if a caller 102 calls into a call center and no human agent is immediately available, analytics engine 140 may direct that the communication session be processed by a speech-enabled intelligent script. In other cases, analytics engine 140 may route calls depending on expected profitability. For example, using an artificial intelligence model, analytics engine 140 may predict which of the incoming callers is most likely to result in profit for the client and prioritize routing them to a human agent. Callers predicted to be less profitable may be routed to speech-enabled intelligent scripts during periods of high call traffic. Geographic location, past interactions, whether the caller pays for premium service, stored client preferences, or any other relevant data may be used by analytics engine 140 to determine whether or not a caller is profitable to the client.

In certain embodiments, a caller 102 may start a communication session with a speech-enabled intelligent script and transition to a communication session with a human agent. For example, a speech-enabled intelligent script may start the communication session and gather basic information before the communication session is transferred to a human agent to continue gathering information or for closing. In certain embodiments, the communication session may only be transferred to a human agent if the speech-enabled intelligent script is unable to complete the call. In other cases, the communication session may start with a human agent who transitions the call to a speech-enabled intelligent script. In still other cases, the caller may be transitioned between a human agent and a speech-enabled intelligent script multiple times during a single communication session. In certain embodiments, the transfer between speech-enabled intelligent script and the human agent is automatic. In other cases, the human agent must initiate the transfer of the communication session from the speech-enabled intelligent script.

In certain embodiments, analytics engine 140 determines which agent is most likely to take over a communication session between a caller 102 and a speech-enabled intelligent script and instructs media server 142 to mimic that agents voice and/or speaking patterns with the speech-enabled intelligent script. This may advantageously lead to a smooth transition in the communication session between the speech-enabled intelligent script and the human agent. In certain embodiments, each human agent records voice lines for use with the speech-enabled intelligent script. In other cases, analytics engine 140 uses audio from previous communication sessions involving the agent to create an associated speech-enabled intelligent script.

Although certain exemplary embodiments have been described above in the context of handling an incoming telephone call, text message, or web chat received at a call-center from caller 102, the present disclosure is not limited to these example embodiments. Rather, the present disclosure contemplates that the various embodiments described herein may be applied to outgoing communications (e.g., telephone calls, text messages, or web chats) initiated at the call-center and directed to caller 102. Additionally, the various embodiments described herein are not limited to the exemplary forms of communication described and may be applied to other forms of communication. For example, the various embodiments described herein may be applied to multimedia communications (including, but not limited to, texting, chatting, and video communications). According to one example embodiment, a communication session may be established over a network, such as network 104, capable of delivering real-time audio and/or video media over IP networks via streaming without requiring an intermediary or third-party software, such as RTP and/or WebRTC. According to another example embodiment, a caller 102 may establish a communication session with an agent (e.g., an agent associated with a host 112 described above) using one of the above-described exemplary forms of multimedia communication or another suitable form of communication. In such a scenario, the called number may be an IP address, uniform resource locator (URL) or other information used to establish a multimedia communication session between the user and the agent. The communication session may be handled in accordance with the principles of the various embodiments described herein.

For instance, in certain embodiments a caller 102 may visit a web site associated with a company utilizing a call-center including service platform 106 described above. In some cases, the web site may include a "Contact Us" button or other suitable mechanism to enable the user to initiate a communication session with an agent (e.g., via one of the forms of multimedia communication described above). As an alternative, the web site may include an automated prompt presented to the user to enable the user to establish a communication session with the agent (e.g., a chat, text, or video conversation). It should be understood, however, that other forms of establishing the communication session between caller 102 and an agent may be used.

Figure 2:
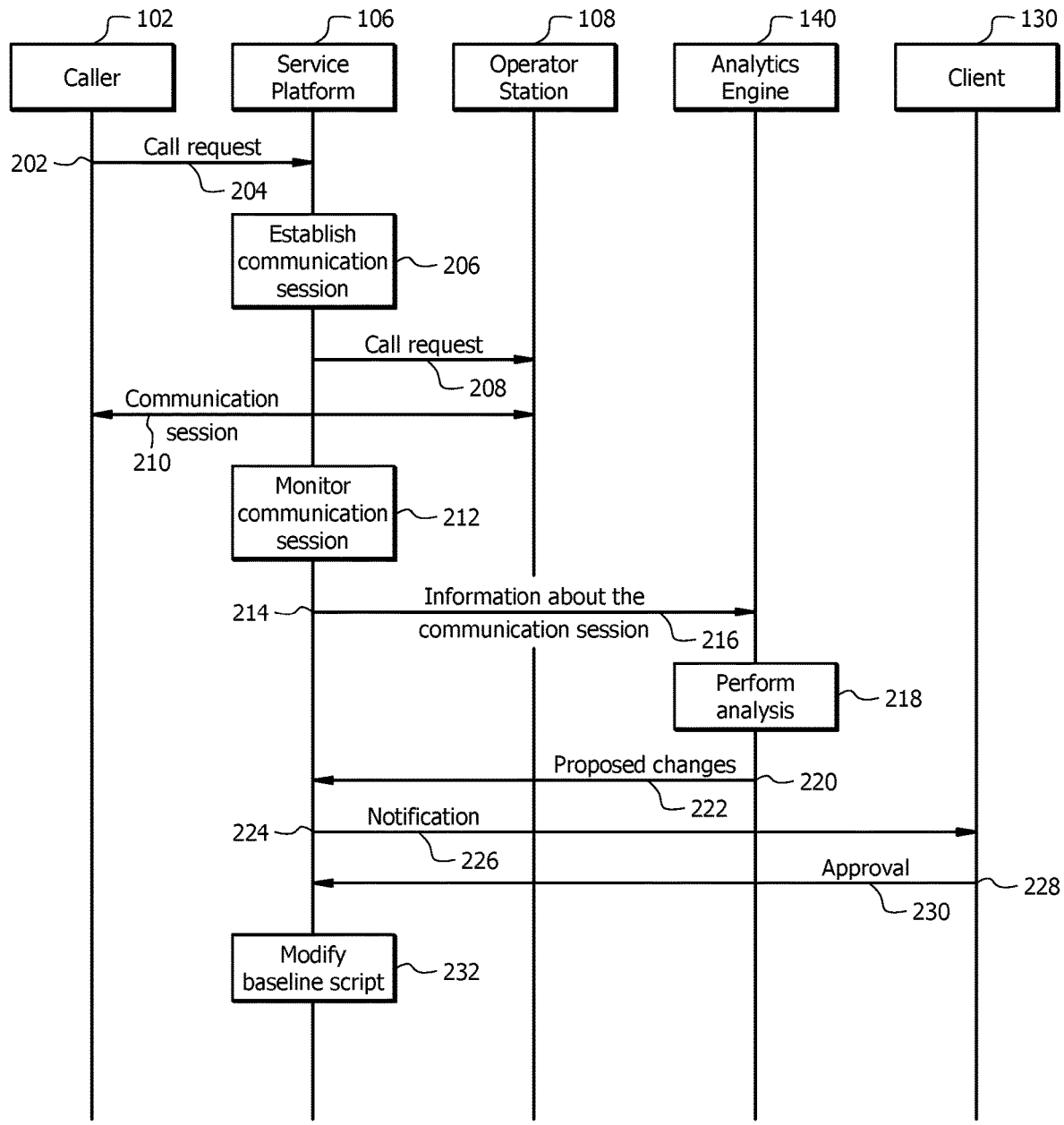
FIG. 2 is a signal diagram of an exemplary process for modifying a baseline script, in accordance with certain embodiments.

FIG. 2 is an exemplary signal flow chart for modifying scripts, in accordance with certain embodiments. In particular, FIG. 2 illustrates an exchange of signals among a caller 102, service platform 106, operator station 108, analytics engine 140, and client 130. At step 202, caller 102 initiates a call by sending a call request 204 that is routed to service platform 106. For example, caller 102 may initiate a call to a call-center running service platform 106. At step 206, service platform 106 establishes a communication session 210 between caller 102 and an agent associated with an operator station 108. In particular, service platform 106 sends a call request 208 to operator station 108 to establish communication session 210.

At step 212, service platform 106 monitors the communication session for information about the actual call flow, for example as described above in relation to FIG. 1. As discussed above in relation to FIG. 1, information about the actual call flow of the communication session may include data transcripts of the communication session, audio or visual recordings of the communication session, information about dispatches, notes taken by the agent or an auditing client, or any other relevant information about the actual call flow of the communication session. At step 214 service platform 106 streams information about the actual call flow of the communication session 216 to analytics engine 140.

In response to receiving the information about the actual call flow of the communication session from service platform 106, at step 218, analytics engine 140 analyzes the received information and determines proposed changes to the baseline script (e.g., an intelligent script or a speech-enabled intelligent script). As discussed in relation to FIG. 1, in certain embodiments, analytics engine 140 may determine proposed changes 222 based on an artificial intelligence model. For example, analytics engine 140 may use a simple linear regression model, naïve bayes model, deep neural network, or other suitable artificial intelligence model to determine proposed changes 222 to modify the baseline script. In some embodiments, steps 202-216 are performed repeatedly before moving on to step 218. This may advantageously give analytics engine 140 a more robust data set from which to analyze and propose changes to the baseline script.

At step 220 analytics engine 140 sends the proposed changes to service platform 106. In certain embodiments, the proposed changes appear as prepopulated fields on the GUI of service platform 106 and are visible to an agent. In certain embodiments, the changes do not appear until they are approved by client 130.

At step 224 service platform 106 sends notification 226 to client 130. At step 228 client 130 sends approval 230, which in certain embodiments may be instructions to modify the baseline script, to service platform 106. As discussed in relation to FIG. 1, the notification may include a variety of information and may take a variety of forms, both of which may vary depending on particular implementations.

At step 232 service platform 106 modifies the baseline script in response to receiving the approval from client 130.

In certain embodiments, steps 212-232 may be repeated in a continuous manner for the same communication session such that the baseline script may be updated in real-time. Such an arrangement may advantageously allow for the script to change dynamically during the communication session.

Figure 3:
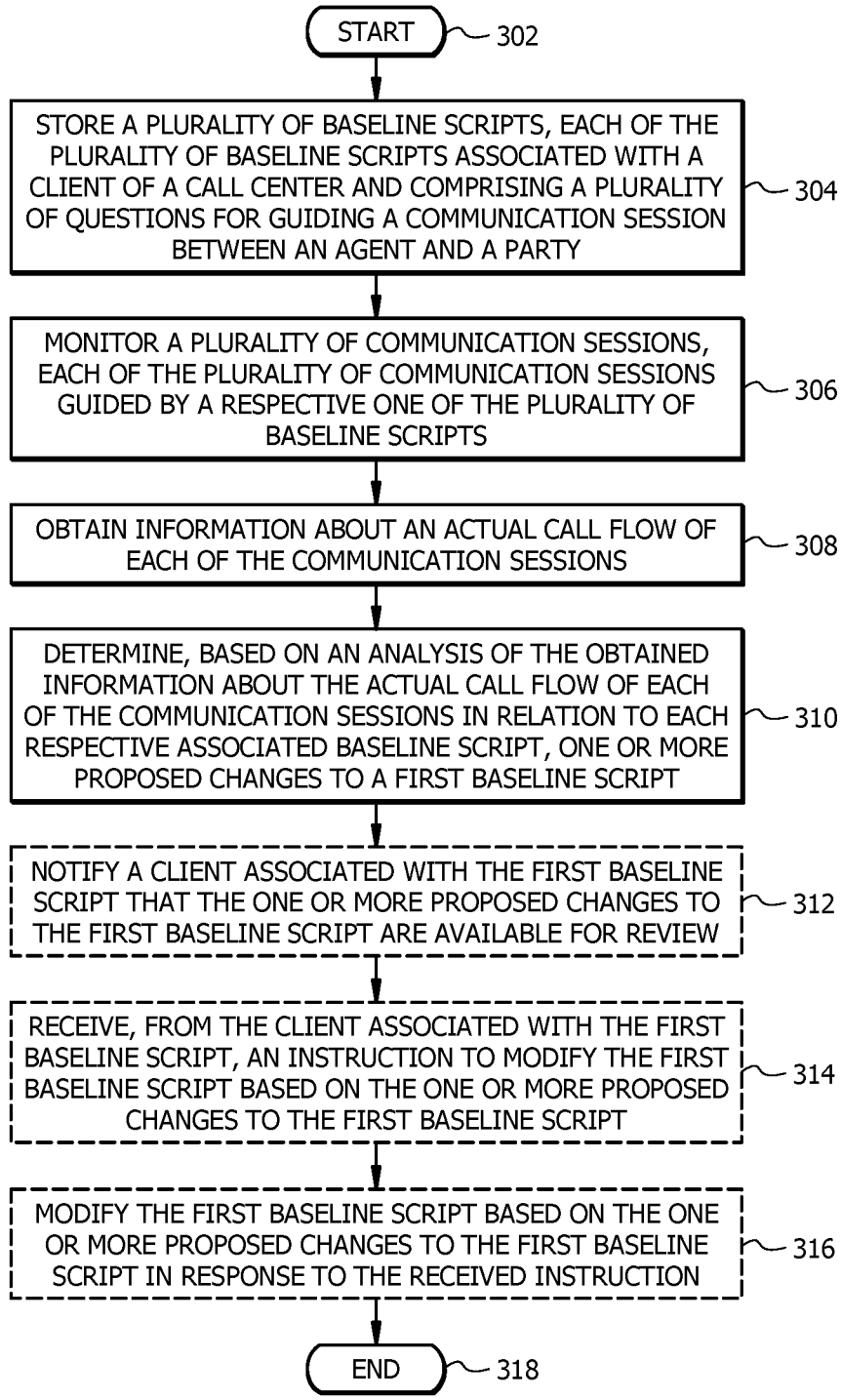
FIG. 3 is a flow diagram of an exemplary method for modifying a baseline script, in accordance with certain embodiments.

FIG. 3 is a flow diagram of an exemplary method for updating a script, in accordance with certain embodiments. In certain embodiments, the method may be performed by a call-center service platform (e.g., service platform 106 described above in relation to FIG. 1). The method begins at step 302. At step 304, a plurality of baseline scripts is stored, each of the plurality of baseline scripts associated with a client of a call-center and comprising a plurality of questions for guiding a communication session between an agent and a party. At step 306, a plurality of communication sessions is monitored, each of the plurality of communication sessions is guided by a respective one of the plurality of baseline scripts.

At step 308, information about an actual call flow of each of the communication sessions is obtained. At step 310, one or more proposed changes to a first baseline script, based on an analysis of the obtained information about the actual call flow of each of the communication sessions in relation to each respective associated baseline script, are determined.

At step 312, a client associated with the first baseline script is notified that the one or more proposed changes to the first baseline script are available for review. At step 314, an instruction to modify the first baseline script based on the one or more proposed changes to the first baseline script is received from the client associated with the first baseline script.

At step 318, the first baseline script is modified based on the one or more proposed changes to the first baseline script in response to the received instruction. At step 318, the method ends.

Figure 4:
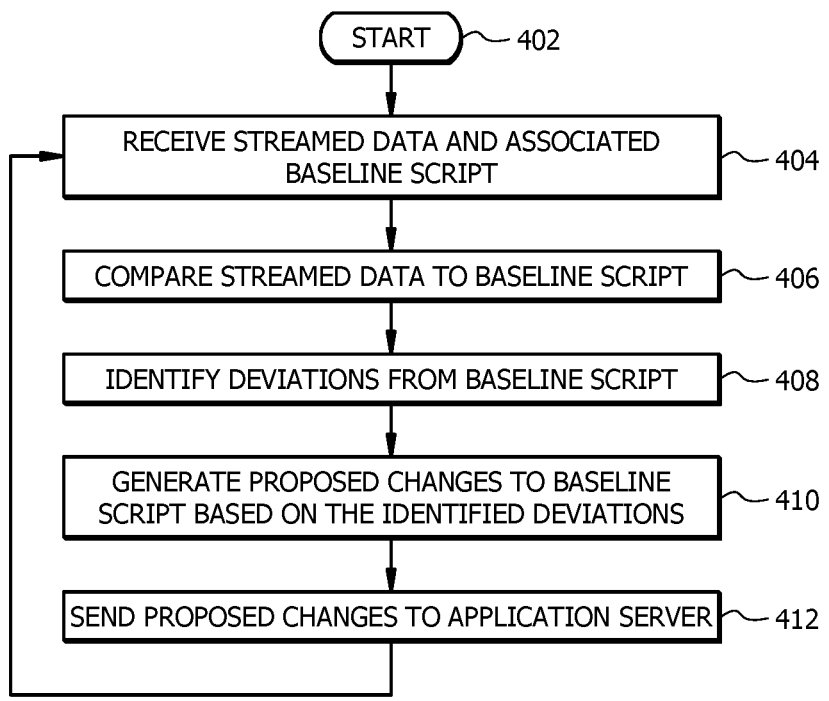
FIG. 4 is a flow diagram of an exemplary method for determining proposed changes to a baseline script, in accordance with certain embodiments.

FIG. 4 is a flow diagram of an exemplary process for analyzing a communication session, in accordance with certain embodiments. In certain embodiments, the method may be performed by an analytics platform (e.g., analytics engine 140 described above in relation to FIG. 1 above). The method begins at step 402.

At step 404, data and an associated baseline script are received. In certain embodiments, the data may be streamed data (e.g. data sent/received in real-time). In certain embodiments, the data may be information associated with an actual call flow of a communication session. In certain embodiments, data may include audio data, video data, text-based data, or any other suitable data type. Likewise, the baseline script may be audio data, video data, text-based data, or any other suitable data type. In certain embodiments, the baseline script is an intelligent script or a speech-enabled intelligent script.

At step 406, the data and baseline script are compared. In certain embodiments, the data and baseline script may be converted to the same file type and format before comparison. In certain embodiments, the data and baseline script may be compared in their respective native file types and formats.

At step 408, deviations from the baseline script are identified.

At step 410, proposed changes are generated based on the identified deviations. As discussed above in relation to FIG. 1, the identified deviations may be used as input variables to an artificial intelligence model used to optimize one or more output variables.

At step 412, proposed changes are sent to a service platform (e.g. service platform 106 described above in relation to FIG. 1). In certain embodiments, steps 404 through 412 are completed in real-time. After step 412, the method returns to step 404.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system, comprising:
a database, the database configured to store a plurality of baseline scripts, each of the plurality of baseline scripts associated with a client of a call-center and comprising a plurality of questions for guiding a communication session between an agent and a party, wherein the plurality of baseline scripts comprises a first baseline script associated with a first client;
an applications server communicatively coupled to the database and an analytics engine, wherein:
the applications server is configured to:
monitor a plurality of communication sessions, each of the plurality of communication sessions guided by a respective one of the plurality of baseline scripts;
obtain information about an actual call flow of each of the communication sessions; and
send the obtained information about the actual call flow of each of the communication sessions to the analytics engine; and
the analytics engine is configured to determine, based on an analysis of the obtained information about the actual call flow of each of the plurality of communication sessions, one or more proposed changes to the first baseline script associated with the first client for guiding a subsequent communication session.

2. The system of claim 1, wherein the analytics engine is configured to send the one or more proposed changes to the first baseline script to the applications server.

3. The system of claim 2, wherein the applications server is configured to modify the first baseline script based on the one or more proposed changes to the first baseline script.

4. The system of claim 2, wherein the applications server is configured to notify a client associated with the first baseline script that the one or more proposed changes to the first baseline script are available for review.

5. The system of claim 4, wherein the applications server is configured to:
receive, from the client associated with the first baseline script, an instruction to modify the first baseline script based on the one or more proposed changes to the first baseline script; and
modify the first baseline script based on the one or more proposed changes to the first baseline script in response to the received instruction.

6. The system of claim 1, wherein the one or more proposed changes to the first baseline script comprise one or more of:
a question to add to the first baseline script;
a question to remove from the first baseline script;
a change to one of the plurality of questions in the first baseline script; and
a change to an order of presentation of the plurality of questions in the first baseline script.

7. The system of claim 1, wherein:
the first baseline script further comprises one or more possible responses to one or more of the plurality of questions; and
the one or more proposed changes to the first baseline script comprise one or more of
a possible response to add to the first baseline script;
a possible response to remove from the first baseline script; and
a change to the one or more possible responses.

8. The system of claim 1, wherein the analysis of the obtained information about the actual call flow of each of the communication sessions comprises an identification of one or more deviations from an associated baseline script during each respective communication session.

9. The system of claim 1, wherein the analytics engine is configured to generate a new baseline script based on the obtained information about the actual call flow of each of the communication sessions.

10. The system of claim 1, wherein:
the agent comprises a speech-enabled intelligent script; and
the first baseline script is the speech-enabled intelligent script.

11. The system of claim 10, further comprising a media server, wherein:
the applications server is configured to instruct a softswitch to send audio associated with each of the communication sessions to the media server; and
the media server is configured to:
generate a transcript of each of the communication sessions; and
send the generated transcript of each of the communication sessions to the applications server.

12. The system of claim 1, wherein the obtained information about the actual call flow of each of the communication sessions comprises a transcript of each of the communication sessions.

13. A method, comprising:
storing a plurality of baseline scripts, each of the plurality of baseline scripts associated with a client of a call-center and comprising a plurality of questions for guiding a communication session between an agent and a party, wherein the plurality of baseline scripts comprises a first baseline script associated with a first client;

monitoring a plurality of communication sessions, each of the plurality of communication sessions guided by a respective one of the plurality of baseline scripts;

obtaining information about an actual call flow of each of the communication sessions; and determining, based on an analysis of the obtained information about the actual call flow of each of the plurality of communication sessions, one or more proposed changes to the first baseline script associated with the first client for Guiding a subsequent communication session.

14. The method of claim 13, further comprising modifying the first baseline script based on the one or more proposed changes to the first baseline script.

15. The method of claim 13, further comprising notifying a client associated with the first baseline script that the one or more proposed changes to the first baseline script are available for review.

16. The method of claim 15, further comprising:
receiving, from the client associated with the first baseline script, an instruction to modify the first baseline script based on the one or more proposed changes to the first baseline script; and
modifying the first baseline script based on the one or more proposed changes to the first baseline script in response to the received instruction.

17. The method of claim 13, wherein the one or more proposed changes to the first baseline script comprise one or more of:
a question to add to the first baseline script;
a question to remove from the first baseline script;
a change to one of the plurality of questions in the first baseline script; and
a change to an order of presentation of the plurality of questions in the first baseline script.

18. The method of claim 13, wherein:
the first baseline script further comprises one or more possible responses to one or more of the plurality of questions; and
the one or more proposed changes to the first baseline script comprise one or more of
a possible response to add to the first baseline script;
a possible response to remove from the first baseline script; and
a change to the one or more possible responses.

19. The method of claim 13, wherein the analysis of the obtained information about the actual call flow of each of the communication sessions comprises an identification of one or more deviations from an associated baseline script during each respective communication session.

20. The method of claim 13, further comprising generating a new baseline script based on the obtained information about the actual call flow of each of the communication sessions.

21. The method of claim 13, wherein:
the agent comprises a speech-enabled intelligent script; and
the first baseline script is the speech-enabled intelligent script.

22. The method of claim 13, wherein the obtained information about the actual call flow of each of the communication sessions comprises a transcript of each of the communication sessions.

* * * * *